(12) United States Patent
McCarthy et al.

(10) Patent No.: US 6,937,237 B2
(45) Date of Patent: Aug. 30, 2005

(54) SORTING DATA BASED ON DATA ATTRIBUTES FOR DISPLAY IN MULTIPLE DISPLAY WINDOWS

(75) Inventors: Dennis John McCarthy, Glen Ellen, CA (US); Donald Wilson Stark, Santa Rosa, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 479 days.

(21) Appl. No.: 09/796,159

(22) Filed: Feb. 28, 2001

(65) Prior Publication Data

US 2002/0154118 A1 Oct. 24, 2002

(51) Int. Cl.[7] .............................................. G06T 11/20
(52) U.S. Cl. ...................................... 345/440; 702/209
(58) Field of Search ............................ 345/440, 440.1, 345/781

(56) References Cited

U.S. PATENT DOCUMENTS

| | | | | |
|---|---|---|---|---|
| 5,081,592 A | * | 1/1992 | Jenq ............................ | 702/68 |
| 5,760,785 A | * | 6/1998 | Barber et al. ................ | 345/440 |
| 5,812,112 A | * | 9/1998 | Helfferich .................. | 345/440.1 |
| 6,057,839 A | * | 5/2000 | Advani et al. ............... | 345/784 |
| 6,088,029 A | * | 7/2000 | Guiberson et al. ........... | 345/808 |
| 6,229,536 B1 | * | 5/2001 | Alexander et al. ......... | 345/440.1 |
| 6,298,363 B1 | * | 10/2001 | Iannuzzelli .................. | 708/400 |
| 6,603,477 B1 | * | 8/2003 | Tittle ........................... | 345/440 |

OTHER PUBLICATIONS

*Agilent 8719D, 8720D, and 8722D Microwave Vector Network Analyzers* brochure, available as part No. 5966–4007E, copyright 1998,2000, from Agilent Technologies, Inc.

* cited by examiner

*Primary Examiner*—Sumati Lefkowitz
*Assistant Examiner*—Motilewa Good-Johnson

(57) ABSTRACT

Traces are placed in a plurality of windows. Each trace is weighted based on a plurality of attributes of the trace. The traces are sorted based on the weighting. Boundaries between traces are assigned based on transitions in attributes. The boundaries function to divide the traces into windows.

20 Claims, 6 Drawing Sheets

SORTING DATA BASED ON DATA ATTRIBUTES FOR DISPLAY IN MULTIPLE DISPLAY WINDOWS

BACKGROUND

The present invention concerns interfaces to electronic devices and pertains particularly to sorting data based on data attributes for display in multiple display windows.

Electronic instruments such as network analyzers and spectrum analyzers generally include a display capable of displaying one or more traces. For example, Model Number 8719D microwave vector network analyzers are available from Agilent Technologies, Inc., having a business address of 395 Page Mill Road, P.O. Box #10395, Palo Alto, Calif. 94306. An 8719D microwave vector network analyzer has a four parameter display that can display all four S-parameters simultaneously. Any combination of reflection and transmission parameters can be displayed, with magnitude, phase, group delay, Smith chart, polar, SWR, or time-domain formats. Results may viewed in overlay or split-screen format on a liquid crystal display (LCD) color display with one, two or four graticules. See, for example, Agilent 8719D, 8720D, and 8722D Microwave Vector Network Analyzers brochure, available as part number 5966-4007E, copyright 1998, 2000, from Agilent Technologies, Inc.

In the past, electronic user interfaces have been implemented, for example, using physically proximate soft keys, switches and knobs, dialog boxes and pointing devices, and touch-sensitive displays.

SUMMARY OF THE INVENTION

In accordance with the preferred embodiment of the present invention, traces are placed in a plurality of windows. Each trace is weighted based on a plurality of attributes of the trace. The traces are sorted based on the weighting. Boundaries between traces are assigned based on transitions in attributes. The boundaries function to divide the traces into windows.

DESCRIPTION OF THE PREFERRED EMBODIMENT

Figure 1:
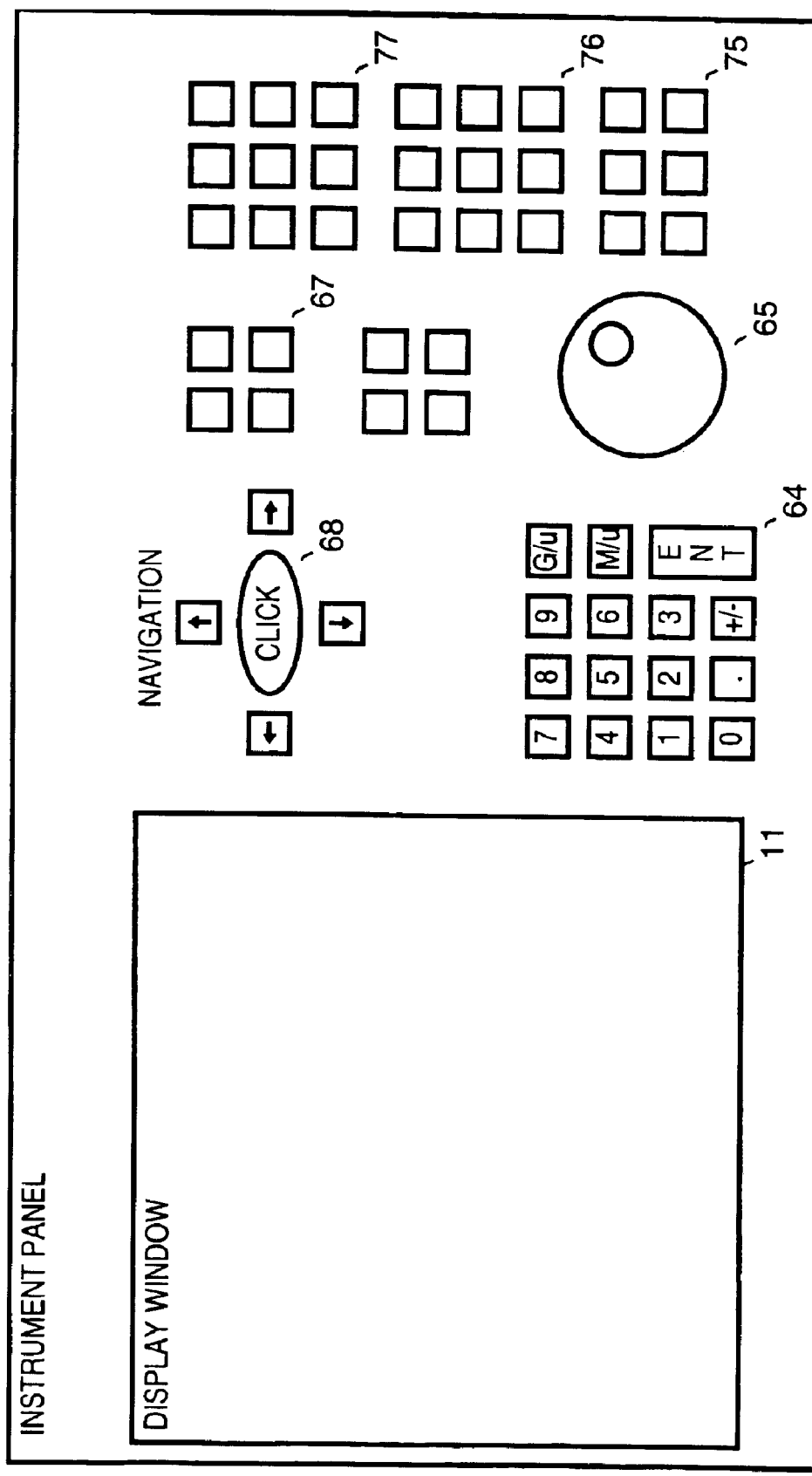
FIG. 1 is a simplified diagram of an instrument panel of an electronic instrument.

FIG. 1 is a simplified diagram of an instrument panel 60 of an electronic instrument. Instrument panel 60 includes an LCD display 11. LCD display 11 is capable of displaying multiple display windows. In the display windows are displayed traces that represent data sets having one or more sortable attributes. The data sets do not change their data or attributes, only their displayed position. Herein, the term "traces" is meant to incorporate the underlying data set that defines the trace, so that the term "sorting traces" indicates that the data sets underlying the traces are sorted.

Data sets are evaluated and sorted according to predefined criteria. The sort algorithm is criteria and data set dependent. The sorting process can handle arbitrary numbers of data sets with arbitrary attributes sorted into arbitrary numbers of windows.

For example, data sets with similar attributes or otherwise related information can be displayed together for easier comparison. Alternatively, data sets with similar attributes can be displayed apart so that display of the data sets in close proximity do not interfere with one another. The sort criteria determines the resulting optimization of the display area.

Sorting is invoked through the instrument user interface. Sortable data criteria can include (but are not limited to) data format, data parameter type (reflection transmission), data acquisition channel number, and data set number.

The present invention is useful when a number of traces is higher than a number of windows in the plurality of windows. The present invention is also useful for rapid switches between configurations. For example, it may be desirable to display four traces in both a one-window configuration and a four-window configuration. In the four-window configuration, the data sets are separate and easier to distinguish from one another. In the one-window configuration, the four data traces are overlaid in a single window; however, the traces are enlarged relative to the four-window display.

Instrument panel 60 also includes a navigation tool 68 consisting of hard keys. Navigation tool 68 can be utilized by a user as a point and select interface.

Instrument panel 60 additionally includes a numeric keypad 64 and a knob 65. Display hard keys 67 include a "Trace" key, a "Window" key, a "Measure/Setups" key and an "Arrange windows" key. Control hard keys 66 include an "OK" key, a "help" key, a "Cancel" key and a "Menu/Dialog" key.

Channel setup hard keys 77 include a "Start/Center" key, a Stop/"Span" key, a "Power" key, a "Sweep Setup" key, a "Channel" key, a "Sweep Type" key, a "Trigger" key, an "Average" key and a "Calibrate" key.

Trace setup hard keys 76 include a "Measure" key, a "Format" key, a "Scale" key, a "Marker" key, a "Marker Table" key, a "Limit Table" key, a "Marker Search" key, a "Marker Function" key and a "Math/Memory" key.

Utility keys 75 include a "Save" key, a "Maximize" key, a "Preset" key, a "Recall" key, a "Print" key and a "Macro" key.

Table 1 below gives an example of four measurements defined by a user for display on display 11.

TABLE 1

|  | Axis Format | Frequency Range | Measurement Path |
|---|---|---|---|
| Trace #1-S11 (Trace 17) | Circular | 10–500 MHz | Reflection |
| Trace #2-S21 (Trace 15) | Rectangular | 10–500 MHz | Transmission |
| Trace #3-S21 (Trace 14) | Rectangular | 10–1000 MHz | Transmission |

TABLE 1-continued

| | Axis Format | Frequency Range | Measurement Path |
|---|---|---|---|
| Trace #4-S22 (Trace 13) | Rectangular | 10–500 MHz | Reflection |

The user can select a number of windows to be used to display the traces. Then the traces are distributed into a number of groups equal to the number of windows selected. Those traces that are most similar are grouped together. A set of attributes is used to determine which measurements are the most similar. When assigning similar traces to groups, some attributes are considered to be more important than others. When sorting is finished, all of the traces in a group are displayed together in one window.

Figure 2:
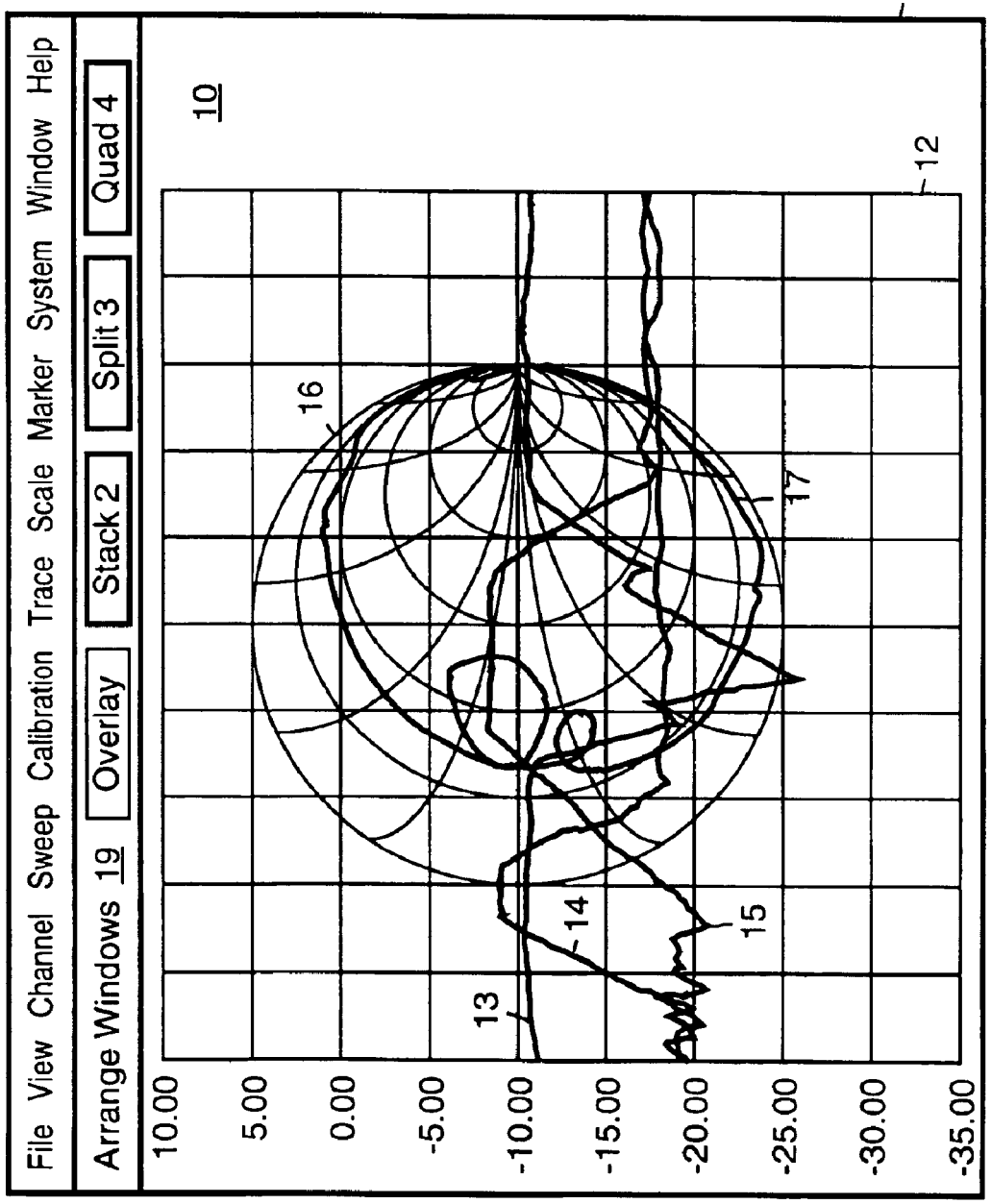
FIG. 2 shows a display window in which four traces are displayed.

For example, in FIG. 2, display 11 shows the four traces displayed in a single window 10. A single window display is selected by the user by selecting an "Overlay" button on an arrange windows toolbar 19.

Trace #1 (labeled in FIG. 2 as trace 17) is shown relative to a circular graticule 16. Trace #2 (labeled in FIG. 2 as trace 15) is shown relative to a rectangular graticule 12. Trace #3 (labeled in FIG. 2 as trace 14) is shown relative to rectangular graticule 12. Trace #4 (labeled in FIG. 2 as trace 13) is shown relative to rectangular graticule 12.

As demonstrated by FIG. 2, it is pretty hard to interpret the data when all the traces are displayed within a single window. The traces are generally different colors, and this helps some. However, there is too much information in a single window and two different kinds of axes are overlapping. Additionally, different x-axis scaling (frequencies) apply to one of the traces. That is, for trace #2 (labeled in FIG. 1 as trace 15) and trace #4 (labeled in FIG. 1 as trace 13) the x-axis represents a frequency range from 10 to 500 MHz. For trace #3 (labeled in FIG. 1 as trace 14) the x-axis represents a frequency range from 10 to 1000 MHz.

Figure 3:
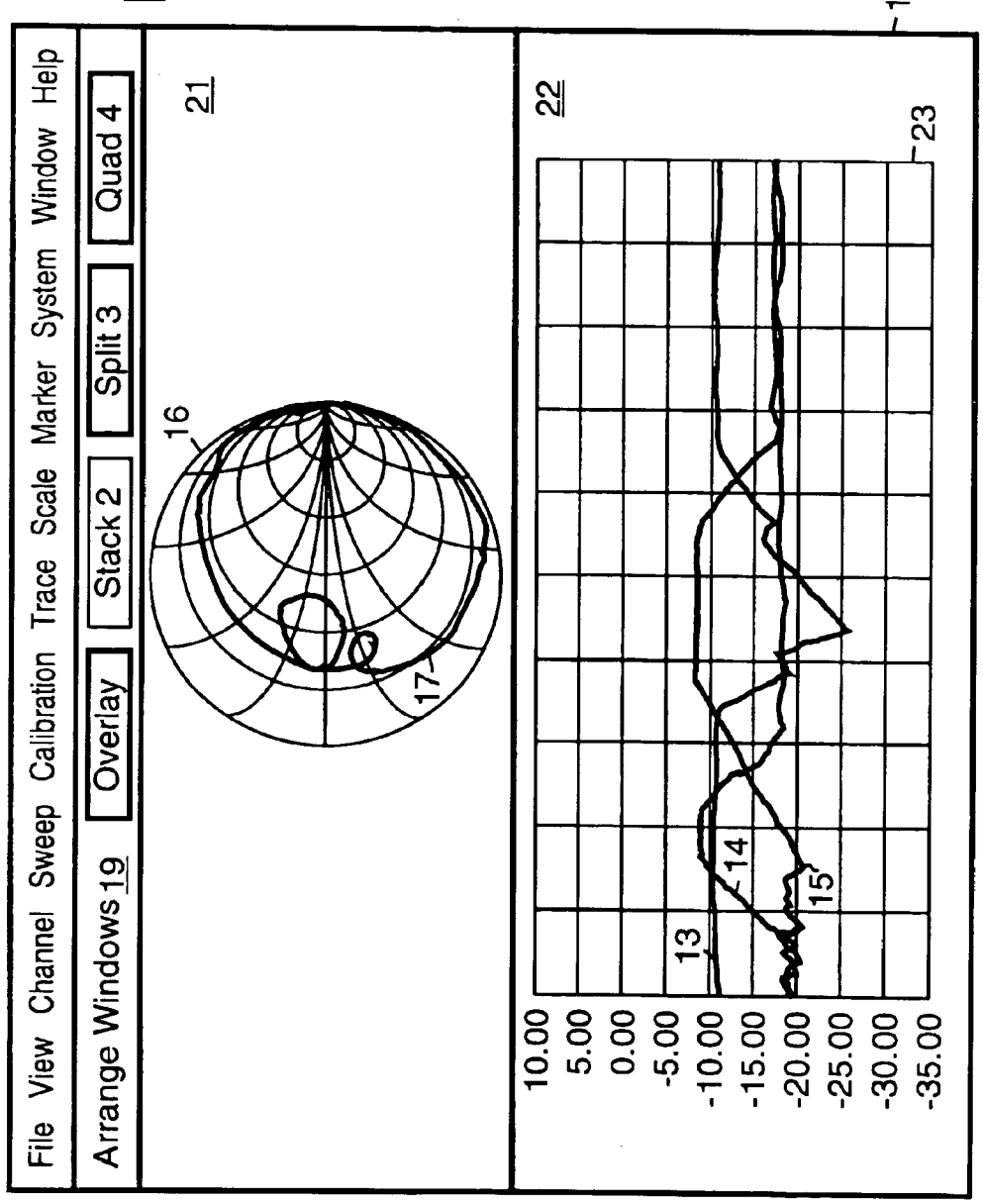
FIG. 3 shows a display window in which four traces have been sorted into two display windows in accordance with a preferred embodiment of the present invention.

In FIG. 3, display 11 shows the four traces displayed in two windows: window 21 and window 22. A split (two) window display is selected by the user by selecting a "Stack 2" button on arrange windows toolbar 19.

In window 21, trace #1 (labeled in FIG. 3 as trace 17) is shown relative to a circular graticule 16. In window 22, trace #2 (labeled in FIG. 3 as trace 15) is shown relative to a rectangular graticule 12. Trace #3 (labeled in FIG. 3 as trace 14) is shown relative to rectangular graticule 12. Trace #4 (labeled in FIG. 3 as trace 13) is shown relative to rectangular graticule 12.

When determining how to group the traces, the electronic instrument gives the most weight to data format (e.g., whether circular or square graticule is used for display). Then the next most weight is given to axis definitions. Additional attributes are weighted in the following order: data parameter type (reflection/transmission), data acquisition channel number, and data set number.

When evaluating the four traces, the electronic instrument looks first for differences in format. Trace #1 is the only measurement with a circular format so it gets its own window. With two windows, the data is easier to understand but information in bottom window 22 is still a little hard to interpret. This is because there are differing definitions or the x-axis. That is, for trace #2 (labeled in FIG. 1 as trace 15) and trace #4 (labeled in FIG. 1 as trace 13) the x-axis represents a frequency range from 10 to 500 MHz. For trace #3 (labeled in FIG. 1 as trace 14) the x-axis represents a frequency range from 10 to 1000 MHz.

Figure 4:
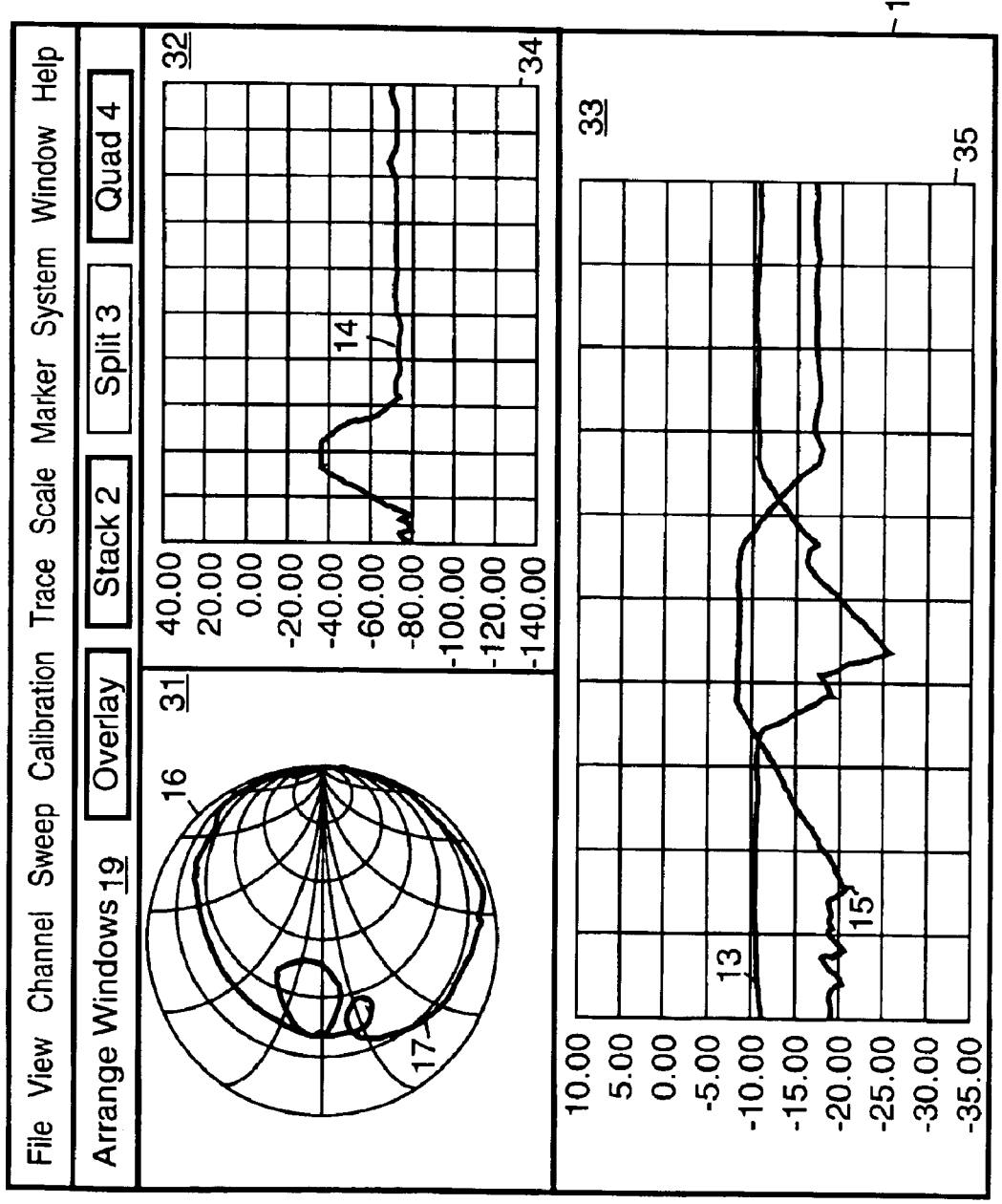
FIG. 4 shows a display window in which four traces have been sorted into three display windows in accordance with a preferred embodiment of the present invention.

In FIG. 4, display 11 shows the four traces displayed in three windows: window 31, window 32 and window 33. A three way split window display is selected by the user by selecting a "Split 3" button on arrange windows toolbar 19.

In window 31, trace #1 (labeled in FIG. 4 as trace 17) is shown relative to a circular graticule 16. In window 32, trace #3 (labeled in FIG. 4 as trace 14) is shown relative to rectangular graticule 34. In window 33, trace #2 (labeled in FIG. 4 as trace 15) and trace #4 (labeled in FIG. 4 as trace 13) are shown relative to a rectangular graticule 35.

When evaluating the four traces, the electronic instrument again looks first for differences in format. Trace #1 is the only measurement with a circular format so it gets its own window. Trace #3 is also placed in a separate window since the x-axis frequency range for Trace #3 different than all of the other traces. Finally, Trace #2 and Trace #4 are placed in the third window.

Figure 5:
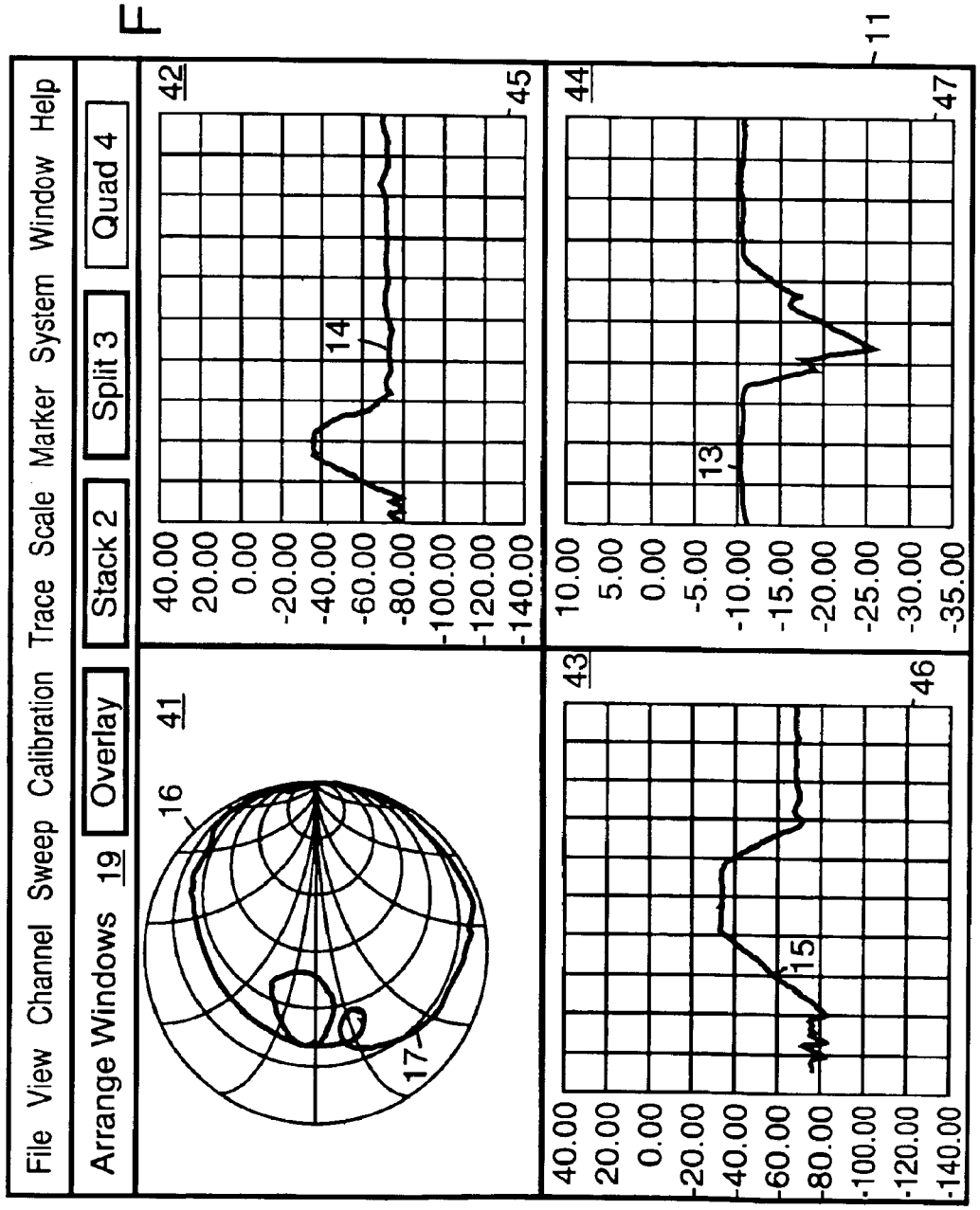
FIG. 5 shows a display window in which four traces have been sorted into four display windows in accordance with a preferred embodiment of the present invention.

In FIG. 5, display 11 shows the four traces displayed in four windows: window 41, window 42, window 43 and window 43. A four way split window display is selected by the user by selecting a "Quad 4" button on arrange windows toolbar 19.

In window 41, trace #1 (labeled in FIG. 5 as trace 17) is shown relative to a circular graticule 16. In window 42, trace #3 (labeled in FIG. 5 as trace 14) is shown relative to rectangular graticule 45. In window 43, trace #2 (labeled in FIG. 5 as trace 15) is shown relative to a rectangular graticule 46. Trace #4 (labeled in FIG. 5 as trace 13) is shown relative to a rectangular graticule 47.

When evaluating the four traces, the electronic instrument takes advantage of the availability of four windows to display each trace in a separate window. Had there been more than 4 traces defined (the number of traces and/or windows are arbitrary), the sorting would have chosen the best way to distribute the traces amongst the selected number of windows.

The use of the automatic algorithm for placing traces is automatic. The user is not required to specify which traces should appear in which window. In the preferred embodiment, window sizes and positions are chosen by the electronic instrument automatically. There is no requirement that a mouse or other pointing device is used. The sorting of measurements is based on criteria which make sense to users of this type of equipment. Further, it is easy for a user, requiring only the selection of buttons to reformat the display in several interesting ways.

Figure 6:
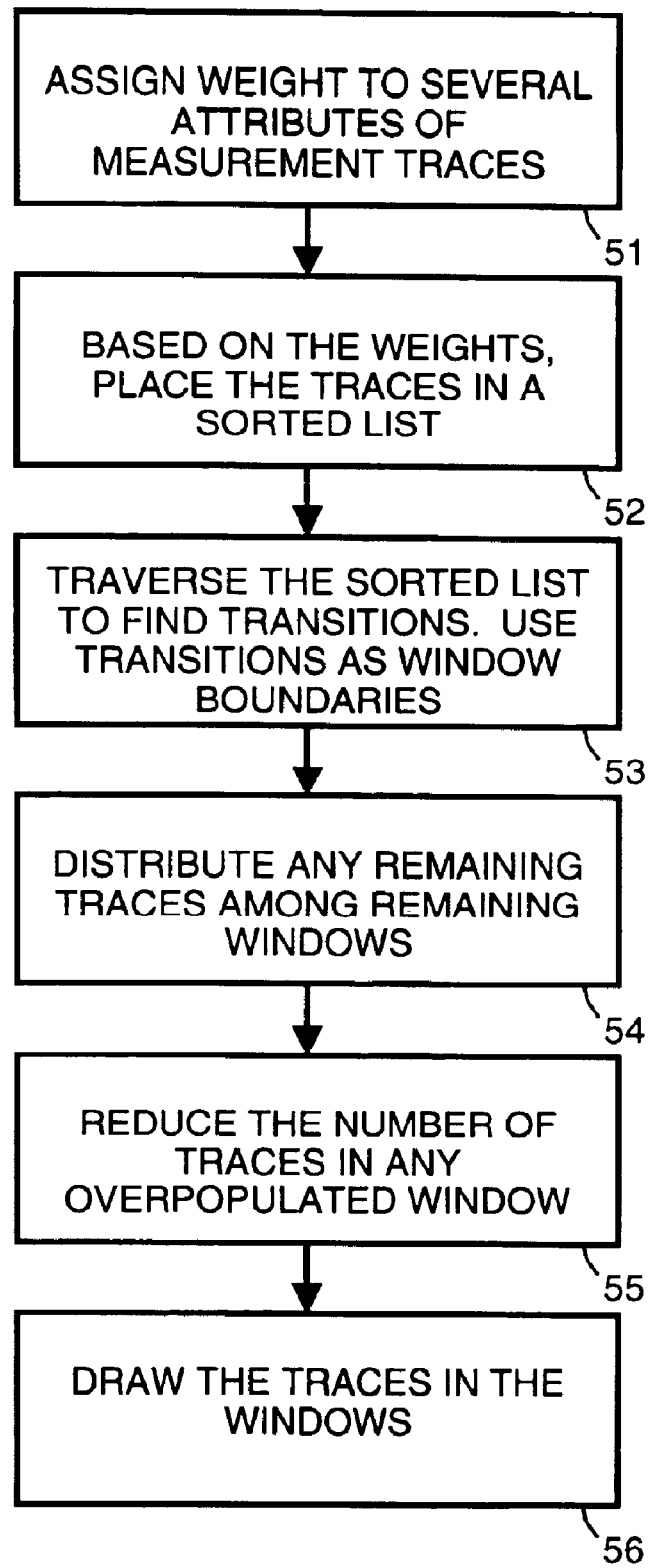
FIG. 6 is a flowchart that illustrates sorting being performed on a plurality of traces in accordance with a preferred embodiment of the present invention.

FIG. 6 shows a flowchart that illustrates sorting being performed on a plurality of traces in accordance with a preferred embodiment of the present invention. In a step 51, a weight is assigned to each of several attributes of the measurement traces. Greater weight is associated with attributes that are more important than others in deciding how to divide the traces into groups. The attributes weighted and the amount of weighting varies dependent upon application. For example, traces can be displayed either with a rectangular or a circular format. Traces can also be either reflection or transmission measurement types. Both shape and measurement type are possible sorting criteria. It is very difficult to interpret circular and rectangular traces in the same window, while it is comparatively easy to interpret transmission and reflection measurements in a single window. Thus, the shape attribute is given greater weight (more importance) than is the measurement type attribute. An overall weight is assigned to each trace. Alternatively, i.e., a multi-dimensional weight can be assigned to each trace (i.e., each attribute can be separately weighted, one attribute per dimension).

In a step 52, the traces are sorted into in a sorted list. The order of traces in the list is determined by their weights, from highest weight to lowest weight.

In a step 53, the sorted list is traversed, looking for transitions of the weighting attributes. Starting with the attribute with the greatest weight, the sorted list is traversed until a trace is encountered for whom the currently considered attribute is different than that of the previous trace. For example, a search is performed for transitions from a circular trace to a rectangular trace. Each time a transition is encountered, a window boundary is placed to mark the current trace. When no more transitions of the current attribute are found, the list of remaining traces is searched for transitions of the next-highest weighted attribute. Traces where transitions occur continue to be marked with window boundaries until either the selected number of windows has been used up, or the end of the sorted list is reached.

In a step 54, any remaining traces are distributed among the remaining windows. That is, if the end of the sorted list is reached without using up the selected number of windows, the remaining traces are evenly distributed amongst the remaining windows.

In a step 55, upon the completion of the placement of window boundary markers in the sorted list, a check is performed to determine if a constraint on the maximum number of traces that can appear in a single window has been violated. If it has been violated, a window boundary is arbitrarily moved to reduce the number of traces in the overpopulated window. This continues until the constraint is satisfied.

In a step 56, the traces are drawn in the windows. Starting at the top of the list, traces are placed into the first window until a window boundary marker is encountered. Subsequent traces are placed in the next window until another boundary marker is found. This process continues until all of the traces have been placed in a window.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

We claim:

1. A method for displaying traces in a plurality of display windows, comprising the following steps:
   (a) weighting each trace based on a plurality of attributes of the trace;
   (b) sorting the traces based on weighting performed in step (a);
   (c) assigning boundaries between traces based on transitions in attributes, the boundaries functioning to distribute the traces into display windows from the plurality of display windows, a number of boundaries plus one not exceeding a number of available display windows in the plurality of display windows; and,
   (d) simultaneously displaying the plurality of display windows on a display, including displaying in the plurality of display windows, the traces as distributed into the display windows.

2. A method as in claim 1 wherein in step (a) the plurality of attributes include at least one of the following:
   data format;
   axis value range;
   data parameter type;
   data acquisition channel number; and,
   data set number.

3. A method as in claim 1 wherein in step (b), the traces are sorted into a sorted list.

4. A method as in claim 1 additionally comprising the following steps:
   (d) when after completing step (c) the number of available display windows is greater than a number of boundaries plus one, assigning traces to empty display windows.

5. A method as in claim 1 additionally, wherein step (d) additionally comprises the following substep:
   when a number of traces assigned to a first display window exceeds a predetermined number, reducing a number of traces assigned to the first display window by assigning an excess number of traces to other display windows.

6. A method for displaying traces in a plurality of windows, comprising the following steps:
   (a) weighting each trace based on a plurality of attributes of the trace;
   (b) sorting the traces based on weighting performed in step (a);
   (c) assigning traces into windows based on based on weighting performed in step (a); and,
   (d) displaying the windows by a display, including displaying the traces as assigned into the windows.

7. A method as in claim 6 wherein in step (a) the plurality of attributes include at least one of the following:
   data format;
   axis value range;
   data parameter type;
   data acquisition channel number; and,
   data set number.

8. A method as in claim 6 wherein in step (b), the traces are sorted into a sorted list.

9. A method as in claim 6 additionally comprising the following step:
   when after completing step (c) there are empty windows to which no traces have been assigned, changing trace assignments so that at least one trace is assigned to every window, provided there are at least as many traces as windows.

10. A method as in claim 6 additionally comprising the following step:
    when a number of traces assigned to a first window exceeds a predetermined number, reducing a number of traces assigned to the first window by assigning an excess number of traces to other windows.

11. Storage media for storing software, the software, when executed on an electronic instrument with computing capability, performing a method for placing traces in a plurality of windows, comprising the following steps:
    (a) weighting each trace based on a plurality of attributes of the trace;
    (b) assigning traces into windows based on weighting performed in step (a) in preparation for display of the plurality of windows by a display of the electronic instrument.

12. Storage media as in claim 11 wherein in step (a) the plurality of attributes include at least one of the following:
    data format;
    axis value range;
    data parameter type;

data acquisition channel number; and, data set number.

13. Storage media as in claim 11 wherein in step (b), the traces are sorted into a sorted list.

14. Storage media as in claim 11 wherein the method additionally comprises the following steps:
   (c) when after completing step (b) there are empty windows to which no traces have been assigned, changing trace assignments so that at least one trace is assigned to every window, provided there are at least as many traces as windows.

15. Storage media as in claim 11 wherein the method additionally comprises the following step:
   (c) when a number of traces assigned to a first window exceeds a predetermined number, reducing a number of traces assigned to the first window by assigning an excess number of traces to other windows.

16. An electronic instrument comprising:
   a display used for displaying a plurality of display windows; and,
   means for placing traces in the plurality of display windows, wherein each trace is weighted based on a plurality of attributes of the trace, and wherein traces are assigned into the plurality of display windows based on weighting of the trace.

17. An electronic instrument as in claim 16 wherein the plurality of attributes include at least one of the following:
   data format;
   axis value range;
   data parameter type;
   data acquisition channel number; and,
   data set number.

18. An electronic instrument as in claim 16 wherein the traces are sorted into a sorted list.

19. An electronic instrument as in claim 16 wherein when there are empty display windows to which no traces have been assigned, trace assignments are changed so that at least one trace is assigned to every display window, provided there are at least as many traces as display windows.

20. An electronic instrument as in claim 16 wherein when a number of traces assigned to a first display window exceeds a predetermined number, a number of traces assigned to the first display window are reduced by assigning an excess number of traces to other display windows.

* * * * *